United States Patent [19]

De Fazio

[11] 4,337,579

[45] Jul. 6, 1982

[54] DEFORMABLE REMOTE CENTER COMPLIANCE DEVICE

[75] Inventor: Thomas L. De Fazio, Watertown, Mass.

[73] Assignee: The Charles Stark Draper Laboratory, Inc., Cambridge, Mass.

[21] Appl. No.: 140,768

[22] Filed: Apr. 16, 1980

[51] Int. Cl.³ ............................................... G01B 5/25
[52] U.S. Cl. ............................... 33/169 C; 33/172 D; 33/185 R
[58] Field of Search ............... 33/169 C, 172, 180 R, 33/185 R; 29/406, 407

[56] References Cited

U.S. PATENT DOCUMENTS

| | | | |
|---|---|---|---|
| 3,824,674 | 7/1974 | Inoyama | 29/407 |
| 3,893,217 | 7/1975 | Edmond | 29/407 |
| 4,098,001 | 7/1978 | Watson | 33/169 C |
| 4,155,169 | 5/1979 | Drake et al. | 33/169 C |
| 4,283,153 | 8/1981 | Brendamour | 33/185 R |

Primary Examiner—Harry N. Haroian
Attorney, Agent, or Firm—Joseph S. Iandiorio

[57] ABSTRACT

A deformable remote center compliance device including operator means, at least a portion of which is deformable, and having a first motion center; and a deformable support means for supporting the operator means to permit rotation about a projected second center and providing in conjunction with the operator means a remote center of compliance between the first and second centers at, near, or beyond the end of the operator means.

4 Claims, 6 Drawing Figures

DEFORMABLE REMOTE CENTER COMPLIANCE DEVICE

FIELD OF INVENTION

This invention relates to a deformable remote center compliance device, and more particularly to such a device in which the operator member is deformable at least in part.

BACKGROUND OF INVENTION

Remote center compliance devices (RCC's) are known which establish rotational motion of an operator member about a remote center typically at, near, or beyond the end of the operator member. In one type of RCC, disclosed in U.S. Pat. No. 4,098,001, there is a first member and a second member. The first member is connected with an intermediate member by a number of first interconnection elements. The second member carries an operator member and is connected with the intermediate member by a number of second interconnection elements. Each element has a major motion section located proximate each of the associated members and about which movement occurs. One of the first and second number of intermediate elements are arranged in parallel to each other; the others are arranged radially to and define the remote center.

Another type of RCC uses two deformable portions which support an operator member and establish a remote center typically at, near, or beyond the end of the operator member, as disclosed in U.S. Pat. No. 4,155,169. In such a structure one deformable portion establishes a first center, the other a second center, and the remote center is located somewhere between them as a function of the relative stiffness of the two deformable portions. The deformable portions typically include a number of deformable elements.

SUMMARY OF INVENTION

It is therefore an object of this invention to provide an improved, simple RCC which requires only one deformable member or set of deformable elements in addition to an operator member which is at least partially deformable to establish a remote center.

The invention features a deformable remote center compliance device. The device includes operator means, at least a portion of which is deformable. The operator means establishes a first motion center. A deformable support means supports the operator means to permit rotation about a projected second center. The deformable support means in conjunction with the operator means provides a remote center of compliance between the first and second centers at, near or beyond the end of the operator means.

In a preferred embodiment, the lower portion of the operator means is deformable and the upper portion is rigid and is interconnected with the deformable support means. The deformable support means is located radially from the projected second center and includes a plurality of elements.

DISCLOSURE OF PREFERRED EMBODIMENT

Other objects, features and advantages will occur from the following description of a preferred embodiment and the accompanying drawings, in which.

The invention may be accomplished in a deformable remote center compliance device (RCC) which includes an operator means, at least a portion of which is deformable and which has a first motion center. A deformable support means supports the operator means and permits rotation about a projected second center. The deformable support means, in conjunction with the operator means, provides a remote center of compliance between the first and second centers at, near, or beyond the end of the operator means. Typically, only the lower portion of the operator member need be deformable: the upper portion may be rigid and interconnected with the deformable support means. The deformable support means is located radially from the projected first center, and typically includes a plurality of individual elements. For example, for a three-dimensional device having four or more degrees of freedom, three such radial elements would be used, whereas if the remote center compliance device were made planar, or two-dimensional, then only two members would be necessary. In any given application, more elements or wires may be used to increase compliance while maintaining strength. Conversely, one might use fewer, thicker wires to increase the stiffness while maintaining the strength. The RCC may be used with a set of replaceable operator means which have different stiffnesses and/or lengths, so that the size of the operator member may be easily changed and yet the remote center be maintained at, near or beyond the end of the operator means. The operator means may be a salient member that engages with a hole, or it may be a hole or cup-shaped member that engages with a salient member. Alternatively, the operator member may carry jaws or some other gripping device. Whatever the construction of the operator member the remote center is located at, near, or beyond its free end. If the operator member holds a work piece, this typically is regarded as a part of the operator member and thus the remote center is located at, near or beyond the end of that work piece.

The remote center is established between the projected second chamber and the first center as a function of the relative stiffness of the operator member deformable portion and the deformable support means. For example, if the support means is rigid, then the remote center will coincide with the first center established by the deformable operator means. In contrast, if the deformable operator means is totally rigid then the remote center is coincident with the projected second center established by the support means. Thus to move the remote center toward the second center one softens the support means or stiffens the operator, and to move the remote center toward the first center one stiffens the support means or softens the operator. See *Machine Design,* Jan. 24, 1980, pp. 89–90; Charles Stark Draper Laboratory Publication R-1276, Feb. 29, 1980.

Figure 1:
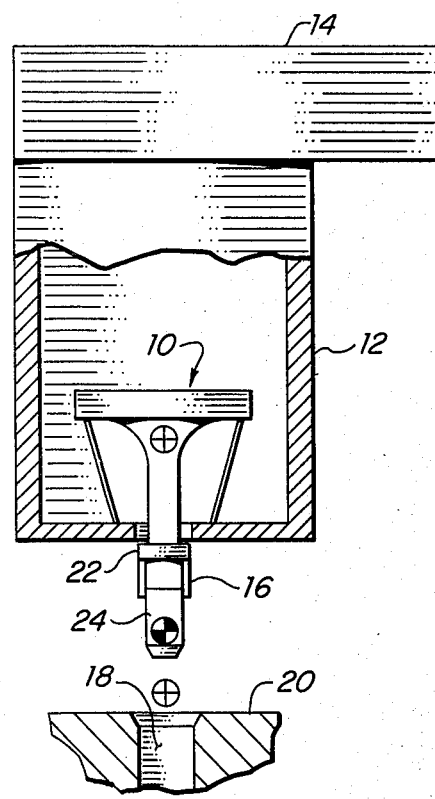
FIG. 1 is a diagrammatical illustration of a deformable remote center compliance device according to this invention in an assembly system.

There is shown in FIG. 1 a deformable remote center compliance device 10 according to this invention, mounted in a rotatable housing 12 rotatably supported by the arm of an automatic assembly apparatus 14 which functions to attempt to grossly locate and align operator member 16 with respect to cooperating member or hole 18 in an adjacent device 20. Operator member 16 may include a grip 22 for holding a part 24, hereafter omitted for simplicity, to be assembled in hole 18. In practice the operator member may contain the hole and the adjacent device 20 a salient member. Rotatable housing 12 may be rotated for threadably engaging parts carried by operator means 16. Housing 12 need not be rotatable—the invention does not depend on, or require, this rotatability. Typically RCC 10 is used to align parts carried by the operator member with parts on adjacent device 20, which may be stationary or moving. Alternatively, the system could be used in docking and coupling applications.

Figure 2:
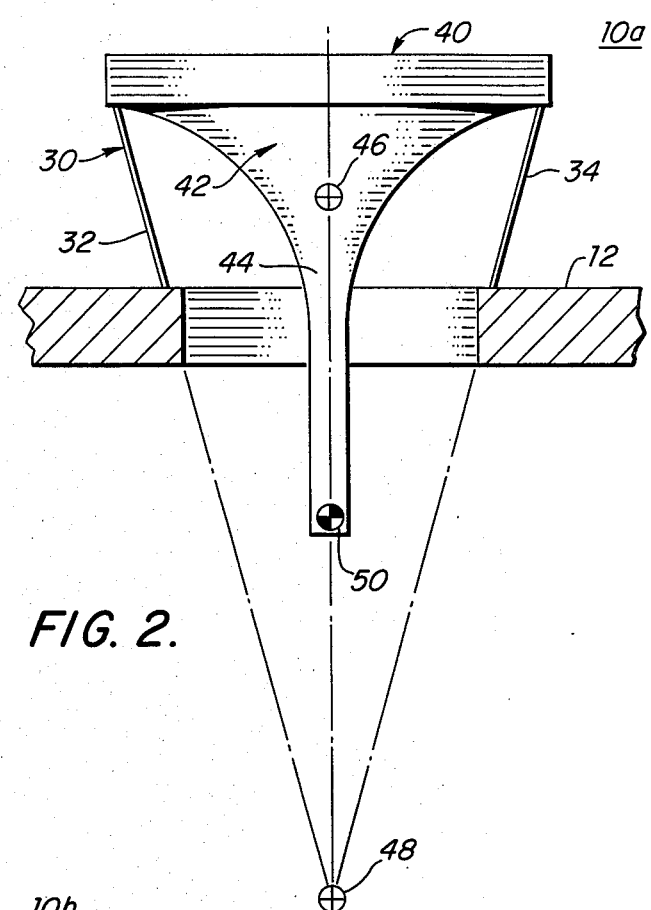
FIG. 2 is an enlarged view of the deformable remote center compliance device similar to that shown in FIG. 1.

Unlike previous RCC's, which used two structures to support the operator means, the RCC of the present invention uses a single support means to support a deformable operator means to produce a simplified, compact RCC 10a, FIG. 2. In RCC 10a support means 30 includes three elements 32, 34, and 36 (36 not shown) which simply may be wires or rods. The operator means 40 includes a stiff upper portion 42 which is interconnected with support means 30, and a deformable lower portion 44. The at least partially deformable operator means 40 establishes a first motion center 46, and support means 30 establishes a second motion center 48 at the point where the extensions of elements 32, 34, and 36 converge; that is, support means 30 is radially disposed from center 48 and elements 32, 34, and 36 lie along radii emanating from center 48. The location of remote center 50 is established between centers 46 and 48 as a function of the relative stiffness of the support means 30 and operator means 40, or more specifically, the deformable portion 44 of operator means 40. Remote center 50 is located at, near, or beyond the end of operator means 40 to facilitate the compliant action of device 10a.

Figure 3:
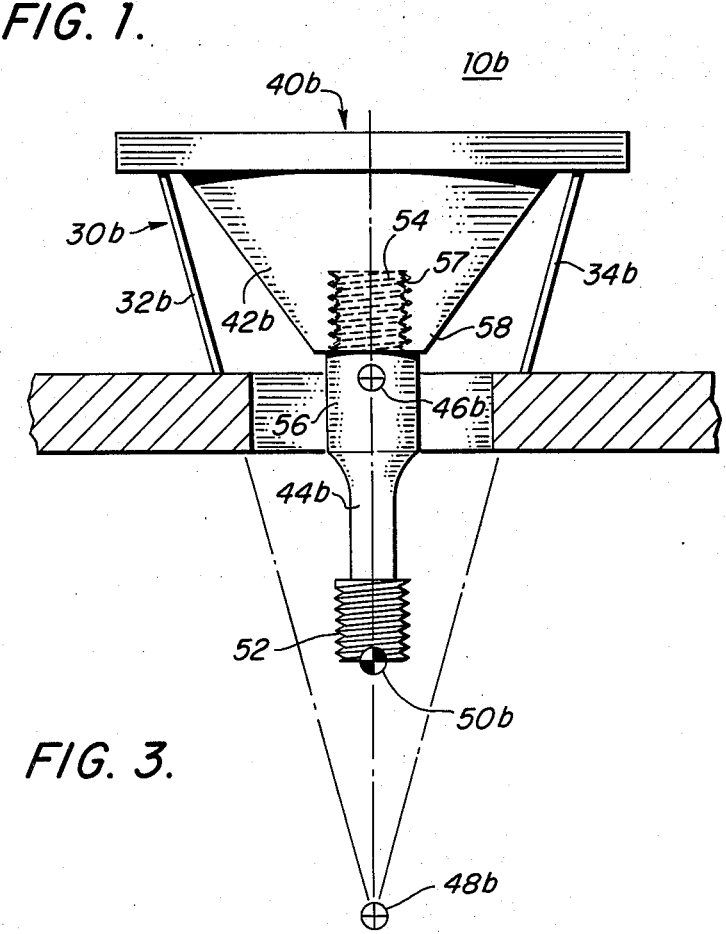
FIG. 3 is a diagrammatic illustration of another construction of a deformable remote center compliance device similar to that shown in FIG. 2.

Operator member 40b, FIG. 3, may assume various configurations, in both its rigid upper portion 42b and deformable lower portion 44b. The lower end of operator member 40b may be designed for any desired use, for example it may include an externally threaded portion 52 for engagement with an internally threaded portion on the work piece. In addition, lower portion 44b may be easily removable and replaceable with respect to upper portions 42b, for example by means of external threads 54 on the upper end 56 of lower portion 44b which engage with internal threads 57 on the lower end 58 of upper portion 42b. Although for convenience the deformable portion 44b is made removable and replaceable with respect to the rigid portion 42b, this is not a necessary limitation of the invention. By varying the bending characteristics, the stiffness, of each of several replaceable operator member lower portions, one may vary the location of the remote center by interchanging the different operator member lower portions.

Figure 4:
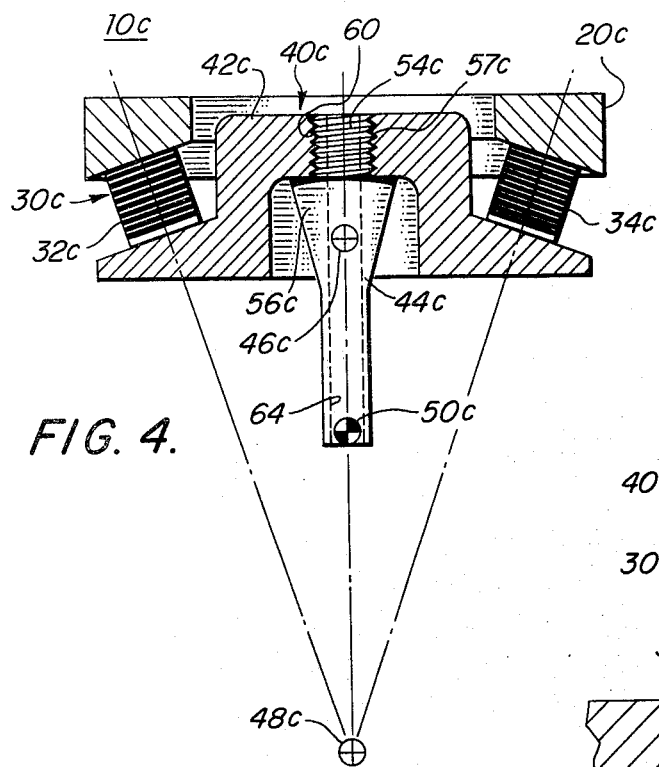
FIG. 4 is a cross-sectional diagrammatic illustration of another construction of a deformable remote center compliance device according to this invention.

Although thus far the construction has been shown using individual wires or rods to construct the support means, this is not a necessary limitation of the invention. For example, as shown in FIG. 4, RCC 10c employs three steel and rubber laminate cylinders to implement elements 32c, 34c, and 36c of support means 30c. Typically, elements 32c, 34c and 36c are approximately one and one eighth inches long and five eighths of an inch in diameter, and are formed of alternate layers of steel and rubber disks approximately twenty to twenty-five thousandths of an inch thick. Parts 20c and 42c are typically made of aluminum or steel, as is part 44c. The upper end 56c of lower portion 44c contains threads 54c that engage with threads 57c in a hole 60c in part 42c. Deformable portion 44c is approximately three inches long and one half inch in diameter and has a substantial hole 64 drilled through it, leaving typically an approximately forty to sixty thousandths of an inch wall thickness, and in some cases as little as fifteen thousandths of an inch. The deformable portion 44c establishes a first center 46c, while the laminate elements 32c, 34c, 36c establish a projected center 48c. Between the two, the remote center 50c is located at, near, or beyond the tip of operator means 40c.

Figure 5:
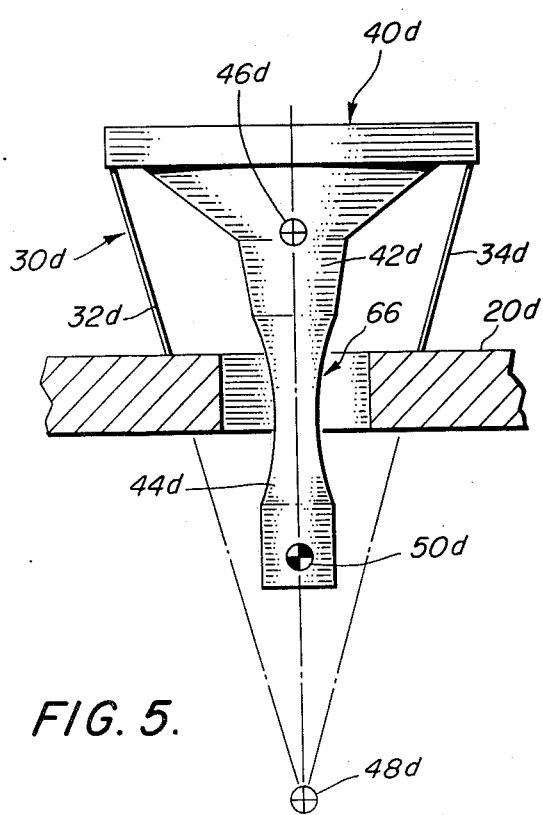
FIG. 5 is a diagrammatic illustration of yet another construction of a deformable remote center compliance device according to this invention.
Figure 6:
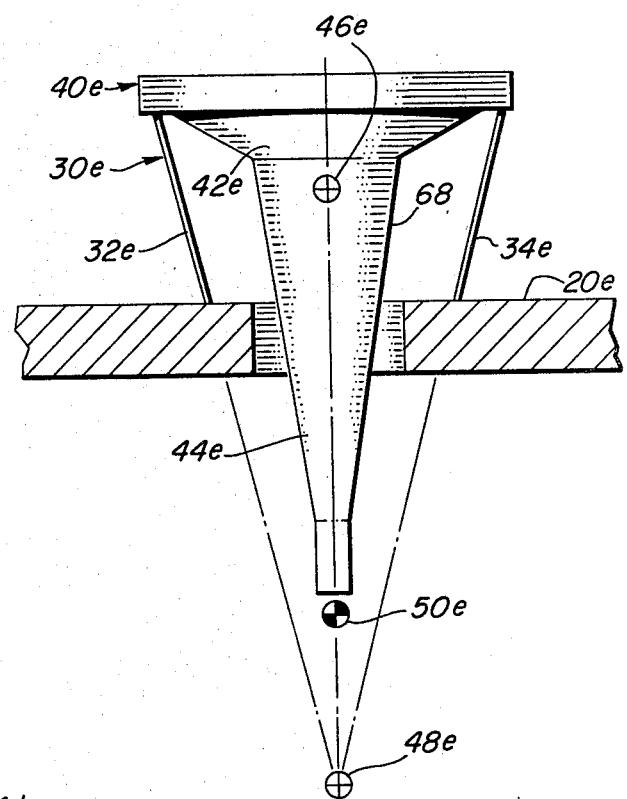
FIG. 6 is a diagrammatic illustration of still another construction of a deformable remote center compliance device according to this invention.

Various shapes may be employed for the operator means. For example, in FIG. 5 the lower portion 44d is necked or reduced as at 66 to provide the proper level of deformability, whereas in FIG. 6 the upper or rigid portion 42e as well as the lower, deformable portion 44e, are tapered as at 68 to provide the proper level of deformability.

Other embodiments will occur to those skilled in the art and are within the following claims:

What is claimed is:

1. A deformable remote center compliance device comprising: a base; an intermediate member; deformable support means disposed along radii from a first motion center interconnected between said base and said intermediate member; and operator means having a first upper rigid portion interconnected with said intermediate member and a second lower deformable portion having a second motion center for establishing a remote center of compliance between said first and second centers of motion at, near or beyond the end of said operator means; said lower deformable portion having a reduced cross-section relative to said upper rigid portion.

2. The remote center compliance device of claim 1 in which said lower deformable portion is tapered to produce said reduced cross-section.

3. The remote center compliance device of claim 1 in which said lower deformable portion is centrally bored to produce said reduced cross-section.

4. The remote center compliance device of claim 1 in which said deformable support means includes a plurality of elements.

* * * * *